Figure 1:
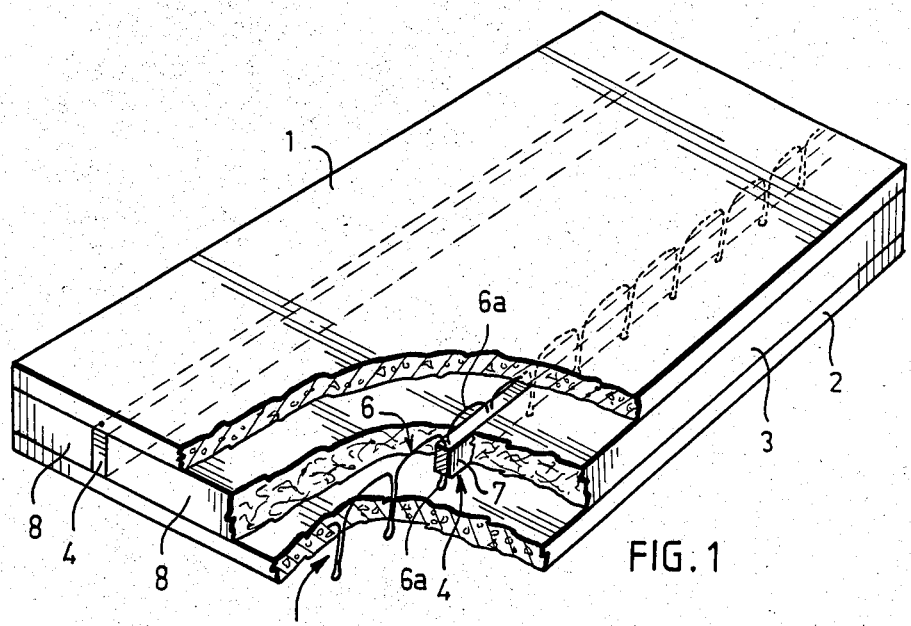

United States Patent [19]

Paakkinen

[11] Patent Number: 4,640,074
[45] Date of Patent: Feb. 3, 1987

[54] CONCRETE BUILDING UNIT OF A SANDWICH STRUCTURE AND A TRUSS ELEMENT AND AN INSULATING PLATE FOR SUCH A BUILDING UNIT

[75] Inventor: Ilmari Paakkinen, Savonlinna, Finland

[73] Assignee: Oy Partek AB, Parinen, Finland

[21] Appl. No.: 772,393

[22] Filed: Sep. 4, 1985

[30] Foreign Application Priority Data

Sep. 10, 1984 [FI] Finland ................... 843531

[51] Int. Cl.$^4$ .............................................. E04C 2/34
[52] U.S. Cl. ................... 52/410; 52/309.11; 52/712; 52/809
[58] Field of Search .......... 52/309.11, 309.12, 309.17, 52/694, 454, 405, 809, 410, 712, 714

[56] References Cited

U.S. PATENT DOCUMENTS

| | | | |
|---|---|---|---|
| 3,305,991 | 2/1967 | Weismann | 52/309.11 |
| 3,494,088 | 2/1970 | Körner | 52/410 |
| 4,117,639 | 10/1978 | Steenson et al. | 52/410 X |
| 4,253,288 | 3/1981 | Chum | 52/309.11 X |
| 4,283,896 | 8/1981 | Fricker et al. | 52/309.11 X |
| 4,297,820 | 11/1981 | Artzer | 52/309.11 |
| 4,336,676 | 6/1982 | Artzer | 52/309.12 X |
| 4,359,848 | 11/1982 | Haeussler | 52/410 X |
| 4,441,292 | 4/1984 | Ericsson | 52/694 X |
| 4,505,019 | 3/1985 | Deinzer | 52/410 X |

FOREIGN PATENT DOCUMENTS

| | | | |
|---|---|---|---|
| 2021192 | 4/1972 | Fed. Rep. of Germany | 52/410 |
| 2119833 | 8/1972 | France | 52/309.12 |
| 2023215 | 12/1979 | United Kingdom | 52/309.12 |

Primary Examiner—J. Karl Bell
Attorney, Agent, or Firm—Cushman, Darby & Cushman

[57] ABSTRACT

A concrete building unit of a sandwich structure, comprising two concrete slabs (1, 2) positioned in parallel at a distance from each other and an insulating layer (3) filling the space between the concrete slabs. Wire trusses (5) are provided between the slabs and are cast in the concrete slabs at the opposite longitudinal edges of the trusses. In order to simplify the assembly of the insulating layer, a truss wire (6) of at least one wire truss (5) is stitched similarly to a sewing thread through an insulating material layer (7) in such a manner that a continuous wire forms loops (6a) protruding from two opposite surfaces of the layer. In a truss element (4) intended for such a building unit, the truss wire (6) is sewn into a beamlike insulating material layer (7) having a rectangular cross-section.

13 Claims, 6 Drawing Figures

CONCRETE BUILDING UNIT OF A SANDWICH STRUCTURE AND A TRUSS ELEMENT AND AN INSULATING PLATE FOR SUCH A BUILDING UNIT

A concrete building unit of a sandwich structure and a truss element and an insulating plate for such a building unit This invention relates to a concrete building unit of a sandwich structure, comprising two concrete slabs positioned in parallel at a distance from each other, wire trusses provided between said concrete slabs and fastened therein at opposite edges of the trusses, and an insulating layer filling the space between the concrete slabs.

Building units of this type are widely used in house building as e.g. wall elements.

The concrete slabs of a building unit are nowadays 50 to 150 mm in thickness and a required heat insulating layer is provided therebetween. The layer is usually formed of plates made of mineral wool or an organic insulating foam, said plates being positioned with their edges against each other in a common plane. During the assembly of the unit, separate trusses are positioned between the insulating plates, which trusses bind the two concrete slabs with each other in the completed unit. The trusses are usually either diagonal trusses in which the truss wire extends in a zigzag-like manner between two parallel longitudinal bars, or ladder trusses in which a number of parallel truss wires extends with a determined spacing between two longitudinal bars. The longitudinal bars of the trusses and the truss wires fastened thereto protrude from the insulating layer and are fixed in the corresponding concrete slabs in such a manner that the concrete slabs are secured to each other by means of the trusses.

The trusses are intended to make the unit operate as a mechanically integral body in spite of the different layers. The trusses ensure the strength of the unit also under a long-term load and, for instance, in the event of fire.

When a building unit is exposed to such a stress that the concrete slabs thereof tend to be displaced with respect to each other in their own planes, a diagonal truss is thereby so affected that the rods which are formed by the truss wire and which extend in one direction are exposed to a tensile load, while the rods extending in the other direction are exposed to a compression load. The capability of individual rods to resist a compression load without buckling is decisive in dimensioning of the truss. A buckling of the rods would easily result in that the whole sandwich unit would become deformed and unfit for use.

It is previously known from U.S. Pat. No. 4,297,820 to make the insulating layer of a building unit of separate trusses and insulating plate strips, which are by turns assembled into a platelike packet which is compacted in a special frame to form an integral plate wherein the truss wires cut into the edge surfaces of adjacent insulating plate strips, the edge surfaces of adjacent strips being pressed against each other at the openings formed by the truss wire. In order that the packet would not fall to pieces after the compacting step, the trusses are interconnected by means of common transversal binding wires.

Although the truss wires in this kind of structure are surrounded by insulating material on all sides, which increases the buckling strength of the wires, the assembly of the separate trusses and the insulating material cut into pieces requires a lot of work. Defects are liable to occur, which increases heat losses. After the assembly, the binding wires still must be fastened on the truss wires through welding, which is inconvenient as well as difficult to be effected. The trusses must be made so stiff that they keep their shape when assembled into said packet.

The object of the present invention is to provide a concrete building unit of a sandwich structure which avoids the above-mentioned disadvantages and in which the insulating layer is more simply formed of trusses and of insulating material. This object is achieved by means of a building unit according to the invention, which is characterized in that a truss wire of at least one wire truss is stitched through the insulating layer similarly to a sewing thread in such a manner that a continuous wire forms loops protruding from two opposite surfaces of said layer.

The invention is based on the idea that the truss wire is sewn directly into an insulating layer, which enables fastening of the truss wire to the insulating layer without any subsequent fastening measures, at the same time as that portion of the truss wire which remains inside the insulating layer is completely surrounded by the insulating material. To manufacture a truss by means of a sewing principle directly into an insulating plate is simple and rational as compared with the present methods, in which the truss is manufactured separately. Thin sewn truss wires require less raw material than separate trusses. This kind of sewn combination of a truss and an insulating material is sufficiently stiff to be handle as such.

Sewing of the truss wire into the insulating material can be easily carried out as a continuous step by machines, whereby the truss wire(s) is(are) sewn into the insulating layer during the manufacture of the layer. The truss thereby need not to be so stiff as to stand independent handling when the truss wire is sewn into the insulating material. All truss wires of the building unit can be sewn into an integral insulating plate forming the insulating layer of the unit or one or more wires can be sewn into a strip of insulating material to form a truss beam which is assembled together with separate insulating plates to form the insulating layer of the unit.

The invention is thus also concerned with a truss element for such a building unit of a sandwich structure, which truss element is characterized in that the truss wire is stitched through the insulating layer similarly to a sewing thread in such a manner that a continuous wire forms loops protruding from two opposite surfaces of said layer.

The truss element can be simply manufactured in the form of a beam, which forms a part of the insulating layer of the building unit. Being a stiff body, the beam is easy to handle and it is used in the manufacture of a building unit in a manner similar to a conventional diagonal or ladder truss. In a truss beam of this kind, no holes or slots causing heat losses are formed in the insulating layer by the truss wire.

The invention is also concerned with an insulating plate for a building unit of a sandwich structure such as described above, which insulating plate is characterized in that said insulating layer forms a plate and that a plurality of mutually parallel truss wires are sewn through the insulating layer at a distance from each other in such a manner that the loops formed by the wires protrude from two opposite surfaces of the plate.

This kind of insulating plate is suitable to be used as such as an insulating layer in a building unit, because the plate is ready provided with the required wire trusses. The insulating plate provided with sewn trusses can be handled in large pieces, which is easy and labour saving.

Figure 2:
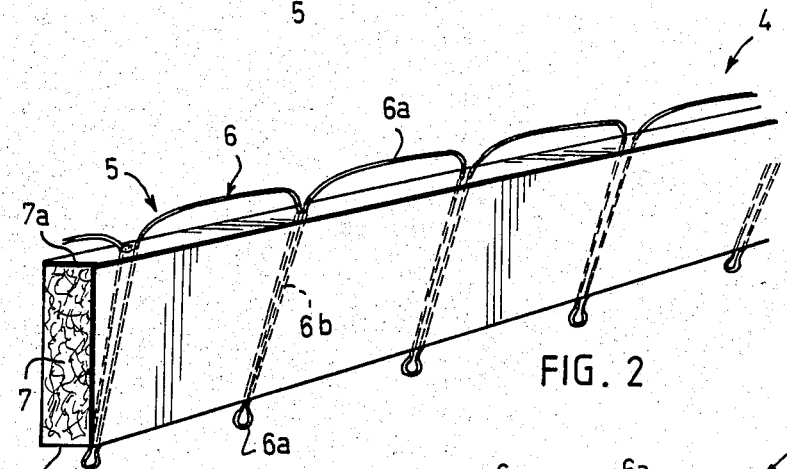
Figure 3:
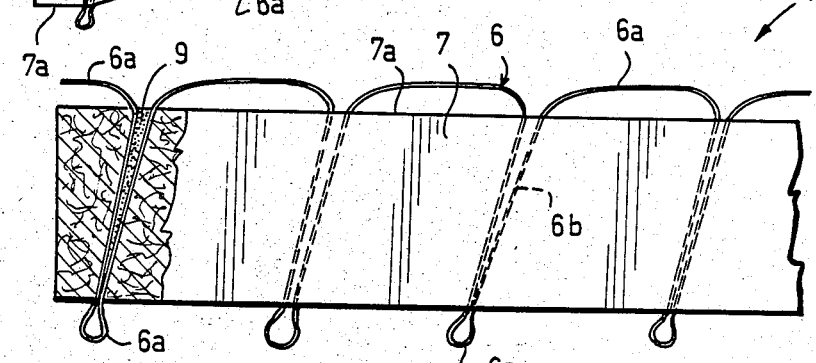
Figure 4:
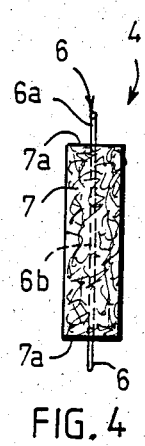
Figure 5:
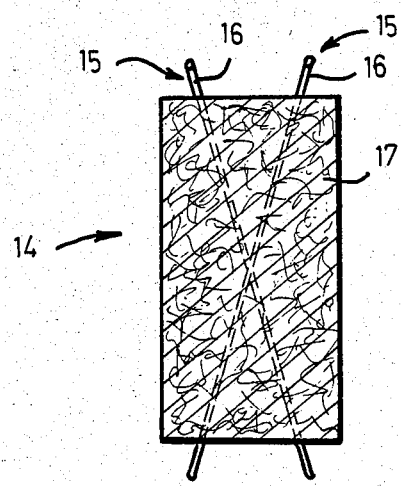
Figure 6:
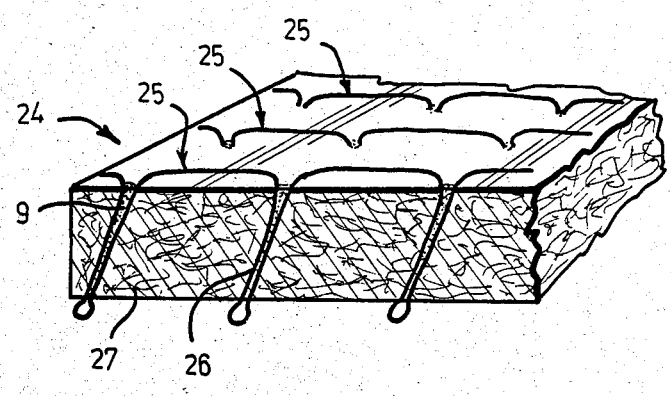

The invention will be more closely described in the following with reference to the attached drawings, wherein FIG. 1 is a perspective view of one preferred embodiment of a building unit according to the invention, FIGS. 2–4 are perspective side and end views respectively of a truss element used in the building unit according to FIG. 1, and FIGS. 5 and 6 are cross-sections of other embodiments of the truss element and an insulating layer.

The building unit of a sandwich structure illustrated in FIG. 1 comprises two parallel concrete slabs 1 and 2 and an insulating layer 3 positioned therebetween. Two truss elements 4 are provided between the concrete slabs, said elements forming part of the insulating layer.

The truss element 4 is formed by a truss 5 comprising a truss wire 6 of steel, which is sewn into an insulating beam 7 made of a glass or mineral wool mass and having a rectangular cross-section. The said sewing is carried out in such a manner that the bends 6a of the truss wire remain outside both opposite sides 7a of the insulating beam. A needle of a sewing machine stitches a wire loop through the insulating layer and a hook beneath receives the wire and spreads it into a suitable enlargement for obtaining a concrete bond. A solution of binding agent 9 is fed into the stitch holes of the wires so as to glue the wire to the insulating material and to fill the stitch hole.

The height of the insulating beam advantageously equals to that of the other insulating plates 8 of the insulating layer 3 between the concrete slabs, which plates are positioned close against the insulating beam on opposite sides thereof. In this way, the bends of the truss wire protrude from the opposite flat sides of the insulating layer 3 and are, in a manner known per se, cast into the concrete slabs. The truss wire thus mechanically connects the concrete slabs with each other.

Because the central portions 6b of the truss wire are sewn into the insulating beam 7, said central portions are on all sides surrounded with a stiff insulating material, whereby said portions are supported in the transversal direction thereof and provided with further buckling strength as well as improved in their capability to stand compressive forces without buckling. Nevertheless, the truss element can be handled similarly to a conventional single truss and it can be similarly anchored in the concrete slabs. The truss wire and the insulating material strip, which separately may not be sufficiently stiff to be manageable, form together a stiff combination which stands handling.

A truss element 14 illustrated in FIG. 5 comprises two trusses 15. The truss wires 16 of the element are sewn into the same insulating material beam 17 so that they are positioned mutually crosswise. In this way a truss beam is provided which is stiffening in the side direction, too.

In an insulating plate 24 illustrated in FIG. 6, a number of truss wires 26 is sewn into an insulating material plate 27 in such a manner that the truss wires are positioned in parallel with and spaced apart from each other. The wires are sewn so as to be alternatively inclined in opposite directions.

The drawings and the description related thereto are only intended to illustrate the idea of the invention. In their details, the building unit, the truss element and the insulating plate according to the invention can vary within the scope of the claims. In place of the round wire suggested, e.g. a flat one, can be used. Instead of mineral wool material, the insulating plate can be made of an organic insulating foam, such as a polyurethane or polystyrene foam, into which the truss wire(s) is(are) sewn.

I claim:

1. A concrete building unit of sandwich structure comprising: two concrete slabs positioned in parallel at a distance from each other; an insulating layer filling the space between the concrete slabs; and wire trusses having truss wires extending through the insulating layer and fastened to the concrete slabs at opposite edges of the trusses, characterized in that a continuous truss wire of at least one wire truss is stitched through the insulating layer in the shape of a sewing thread in such a manner that the truss wire forms loops protruding from two opposite surfaces of said layer into the respective concrete slab.

2. A building unit as in claim 1 characterized in that two truss wires are sewn cross-wise through the insulating layer in such a manner that the loops formed by the wires protrude from two opposite surfaces of the insulating layer.

3. A building unit as in claim 1 characterized in that said insulating layer forms a long planklike beam having a rectangular cross-section and extending in the direction of the truss formed by the truss wire.

4. A building unit as in claim 1 characterized in that said insulating layer forms a plate and that a plurality of mutually parallel truss wires are sewn through the insulating layer at a distance from each other in such a manner that the loops formed by the wires protrude from two opposite surfaces of the plate.

5. A building unit as in claim 1 characterized in that the stitching points of the truss wire are filled with a binding agent.

6. A truss element for a concrete building unit of a sandwich structure, said truss element comprising a beamlike, insulating layer and at least one wire truss having a truss wire extending between two opposite surfaces of the insulating layer and protruding from said surface, characterized in that the truss wire is stitched through the insulating layer similarly to a sewing thread in such a manner that a continuous wire forms loops protruding from two opposite surfaces of said layer.

7. A truss element as in claim 6 characterized in that said insulating layer forms a long planklike beam having a rectangular cross-section and extending in the direction of the truss formed by the truss wire.

8. A truss element as in claim 7 characterized in that the stitching points of the truss wire are filled with a binding agent.

9. An insulating plate for a concrete building unit of a sandwich structure, said insulating plate comprising an insulating layer and wire trusses having truss wires extending between two opposite surfaces of the insulating layer and protruding from said surfaces, characterized in that said insulating layer forms a plate and that a plurality of mutually parallel truss wires are sewn through the insulating layer at a distance from each other in such a manner that the loops formed by the wires protrude from two opposite surfaces of the plate.

10. An insulating plate as in claim 9 characterized in that the stitching points of the truss wires are filled with a binding agent.

11. A concrete building unit of sandwich construction comprising: two concrete slabs positioned in parallel and at a distance from each other; an insulating layer filling the space between the concrete slabs; and at least one truss wire sewn back and forth through the insulating layer along a longitudinal path parallel to the slabs in a manner such that first portions of the wire pass through the thickness dimension of the layer at spaced apart locations and second portions of the wire form loops protruding from the opposite surfaces of the layer into the respective concrete slab which has been cast around the loops.

12. A building unit as in claim 11 wherein said first portions of said truss wire at each location where they pass through said layer lie in a single hole through said layer and are essentially parallel to each other and closely adjacent each other.

13. A method of making a concrete unit of sandwich construction comprising: sewing at least one truss wire back and forth through the thickness dimension of a layer of insulating material in a manner such that the truss wire forms loops protruding from the opposite surfaces of the layer; and subsequently casing a slab of concrete adjacent each of said opposite surfaces of the layer of insulating material in a manner to embed said loops in the respective slab.

* * * * *